3,523,772
STEAM REFORMING OF HYDROCARBONS
Wilbur K. Leaman, Medford Lakes, Charles J. Plank, Woodbury, and Edward J. Rosinski, Deptford, N.J., assignors to Mobil Oil Corporation, a corporation of New York
No Drawing. Filed Dec. 20, 1966, Ser. No. 603,177
Int. Cl. C01b *2/14;* B01j *11/00*
U.S. Cl. 48—214                                        8 Claims

ABSTRACT OF THE DISCLOSURE

Steam reforming of either normally gaseous or liquid hydrocarbons is effected in the presence of a crystalline aluminosilicate promoted with one or more hydrogenating-dehydrogenating metal components, the crystalline aluminosilicate being preferably of a particle size of less than 1 micron.

---

The present invention relates generally to conversion of hydrocarbons by steam reforming with crystalline aluminosilicate catalysts to produce gaseous products. More particularly, the present invention relates to a process for steam reforming of normally gaseous or normally liquid hydrocarbons to produce gas products including town gas and high hydrogen content gas in the presence of a crystalline aluminosilicate catalyst having a metal hydrogenation - dehydrogenation component associated therewith.

Town gas contains basically three components, namely; a lean gas comprising essentially hydrogen, a rich gas which is predominately gaseous hydrocarbons, and a ballast gas which can be either nitrogen or carbon dioxide or both. Town gas can be produced by the gasification of coal or coke by treatment thereof with steam to produce carbon monoxide and hydrogen. The carbon monoxide can be further catalytically converted with steam to carbon dioxide and hydrogen by the water-gas shift reaction. In addition, methane can be formed by reaction of carbon monoxide and hydrogen. The final gas composition will vary depending upon the reaction temperature and the proportion of steam employed. When town gas is produced from coal or coke, it is usually necessary to add a low boiling hydrocarbon gas thereto to increase the caloric value thereof.

Normally gaseous hydrocarbons such as found in natural gas generally are not used to produce town gas by steam reforming because of the relatively low concentration of hydrocarbons in the resulting gas product. However, steam reforming of normally gaseous hydrocarbons finds use in the production of a high hydrogen content gas. The carbon oxide gases produced in this reaction are generally separated from the product to obtain hydrogen gas having a purity in the order of about 95 percent or greater. The hydrogen is used in a number of processes including ammonia synthesis, and other catalytic processes such as hydrocracking and reforming.

Presently there is interest in catalytic steam reforming of normally liquid hydrocarbons such as naphtha to produce town gas. Town gas produced from normally liquid hydrocarbons is generally characterized by a higher caloric value as compared to town gas produced from coal or coke. Unfortunately, when employing a normally liquid hydrocarbon feed in steam reforming, the catalyst employed therein has a greater tendency to become contaminated with residual coke as compared to a catalyst used to convert a normally gaseous hydrocarbon feed. To alleviate the formation of residual coke on the catalyst, increased steam to hydrocarbon ratios have been employed. It has been found that increased concentrations of steam promote the conversion of coke to carbon oxides and hydrogen which assists in preventing catalyst deactivation. However, from a commercial standpoint, increased steam to hydrocarbon ratios in steam reforming are generally undesirable since increased heat input, increased reactor size and increased condensation-separation size are generally necessitated thereby. It therefore is desirable to employ steam to hydrocarbon ratios approaching the theoretical ratio for complete conversion of the feed to desired gaseous products while operating at residual coke free levels.

It is an object of the present invention to provide a steam reforming process to convert normally liquid hydrocarbons to normally gaseous products at relatively low steam to hydrocarbon ratios.

It is a further object of the present invention to provide a steam reforming process to convert normally gaseous hydrocarbons to a high hydrogen content gas.

Accordingly, by the present invention, a normally gaseous or normally liquid hydrocarbon is contacted with steam in the presence of a catalyst derived from a crystalline aluminosilicate and having one or more metal hydrogenation - dehydrogenation components associated therewith. Reaction conditions including temperature and steam to hydrocarbon ratios are varied depending upon the hydrocarbon feed employed and the composition of the desired product gas.

The catalysts employed in the process of this invention comprise one or more metal hydrogenation components, in combination with a crystalline aluminosilicate zeolite base material. The metal hydrogenation components which can be employed with the crystalline aluminosilicate base include the Group VI-B and Group VIII metals of the Periodic Table as well as their oxides or mixtures thereof. The Group VI-B metals which can be employed include chromium, molybdenum and tungsten while the Group VIII metals which can be employed include iron, nickel, cobalt, the platinum group metals and the palladium group metals. The preferred metal hydrogenation components are nickel, cobalt, platinum and iron.

The crystalline aluminosilicate cracking component is a structure having uniformly dimensioned pores formed by alumina and silica tetrahedra. There are available at the present time a number of crystalline aluminosilicates, each of which have their own characteristic pore size openings. For purposes of the present invention, it is desirable to employ a crystalline aluminosilicate having pore size openings between about 4 angstroms and about 13 angstroms, preferably from about 6 to about 13 angstroms. The crystalline aluminosilicate employed herein can be derived from naturally occurring crystalline aluminosilicates or synthetic crystalline aluminosilicates. Among the crystalline aluminosilicates which can be used for purposes of the present invention are the naturally occurring crystalline aluminosilicates such as faujasite, mordenite, chabazite, stilbite, ferrionite, heulandite, dachiaridite, clinoptilolite, and erionite and the synthetic zeolites such as zeolites X, Y, B, L, A, T and ZK15. These synthetic crystalline aluminosilicates are usually prepared in the sodium form. In some cases it is desirable to alter the crystalline aluminosilicate to remove sodium by employing known base exchange techniques. However, it is within the scope of the present invention to employ a crystalline aluminosilicate which has not been base exchanged to remove sodium so long as the requisite stability and performance is obtained. The crystalline aluminosilicate may also be dispersed in an inorganic oxide matrix. Preferred matrices comprise hydrous oxides such as those rich in silica, alumina and materials thereof such as clays, gels and the like.

In a preferred form of this present invention, a crystalline aluminosilicate is employed having a particle size of less than about 1 micron and preferably less than about 0.5 micron. Small particle size aluminosilicates are desirable since intraparticle diffusion is thereby minimized and thus catalyst efficiency is increased. It is difficult to obtain small particle sized crystalline aluminosilicates by mechanical methods since the crystallinity of the product is greatly reduced thereby. One method of producing small size zeolite Y without excessive loss of crystallinity is disclosed in copending application Ser. No. 531,340 to Argauer et al., filed Mar. 3, 1966.

The synthetic crystalline aluminosilicates are usually prepared in the sodium form while the naturally occurring crystalline aluminosilicates usually contain sodium ions and other metal ions such as calcium. It has been found that the cracking activity and the stability of these crystalline aluminosilicates can be very materially increased by replacing the great majority of the sodium ions therein with other metal ions or hydrogen ions. In particular, it has been found that sodium in the presence of steam tends to act as a flux and results in catalyst surface area reduction and crystallinity reduction. Typically, the crystalline aluminosilicates are base exchanged with a fluid containing metal ions which are interchangeable with sodium in a manner such as described in U.S. Pats. 3,140,249 and 3,140,253 to Plank et al. Metallic cations which can be exchanged with the sodium ions in the crystalline aluminosilicate are those in the Groups I–B through VIII of the Periodic Table as well as the rare earths. In addition, the sodium can be removed from the crystalline aluminosilicate by base exchanging with a hydrogen precursor cation such as the ammonium ion to obtain the crystalline aluminosilicate in hydrogen form. Further, the crystalline aluminosilicate can be base exchanged in a manner to replace the sodium cation with a mixture of the above metal cations or a mixture of the above metal cations with a hydrogen containing ion. The preferred forms of the crystalline aluminosilicate are those containing divalent or multivalent cations. Thus, it is seen that the hydrogenating metal can be employed to function as a means for removing sodium from the crystalline aluminosilicate as well as providing hydrogenating activity for the catalyst.

The metal hydrogenation component of the crystalline aluminosilicate catalyst is present in amounts of from about 0.5 to about 50 weight percent and preferably from about 1 to about 25 weight percent based upon the weight of the crystalline aluminosilicate. The metal hydrogenation component is introduced into the crystalline aluminosilicate either by ion exchange and/or impregnation. Introduction of the metal hydrogenation component by ion exchange can be accomplished before, during or after base exchange with cations capable of removing sodium from the aluminosilicate, such as the hydrogen ions, ammonium ions or cations of trivalent metals such as rare earths or mixtures thereof. In the process of the present invention, the preferred catalysts comprise rare earth, hydrogen, or aluminum base exchanged zeolite X or zeolite Y having as a hydrogenation component nickel, cobalt, platinum or iron.

The methods for ion exchanging aluminosilicates to introduce thereto desired ions are well known. One method comprises contacting the aluminosilicate with an aqueous solution of a salt of of the ion desired. The concentration of metal salts in the aqueous solution can range from about 0.1 N to above 2.0 N, although about 1.0 N solutions are preferred for ease of operation. In addition, the ion exchange treatment can be carried out with metal cations in the form of molten material, vapor or non-aqueous solution and can be passed slowly through a fixed bed of aluminosilicate. The salt should be of a molecular size sufficiently small to enter and exit the pores of the aluminosilicate. Representative of the metal salts which can be employed to base exchange aluminosilicates include chlorides, bromides, iodides, carbonates, bicarbonates, sulfates, sulfides, thiocyanates, dithiocarbonates, peroxysulfates, acetates, benzoates, citrates, nitrates, nitrites, formates and the like. The particular salt employed must be sufficiently soluble in the solutizing medium employed to give the necessary ion transfer. The preferred salts are chlorides, nitrates, sulfates and acetates.

Following the base exchange treatment with the salt, the aluminosilicate may be washed with water, preferably distilled water, and generally thereafter dried between 150° F. and 600° F. The aluminosilicate can thereafter be calcined in air or an inert atmosphere or nitrogen, hydrogen, helium, flue gas or other inert gas at temperatures ranging from about 500° F. to 1500° F. for periods of time ranging from 1 to 48 hours or more.

It is preferred that at least some of the hydrogenation component be introduced into the crystalline aluminosilicate by base exchange rather than by impregnation. Metal incorporated by exchange has less tendency to migrate to the catalyst surface and form agglomerates thereon. Such migration, in effect, reduces the effective catalyst surface area by closing the pores and results in an inefficient catalyst. Incorporating at least some of the hydrogenation compound by well-known impregnation processes also produces superior catalysts. Again, the hydrogenation component may be incorporated before, during or after ion exchanging the aluminosilicate to reduce its sodium content.

In the process of this invention, the minimum amount of steam necessary to maintain substantially coke free operation will vary with the composition of the hydrocarbon charge stock employed. This minimum amount of steam increases with a molecular weight increase of the charge stock and with an increase in the degree of unsaturation of the charge stock. The amount of steam employed is expressed in terms of the moles of steam per carbon atom in the hydrocarbon charge or the steam to carbon mole ratio. By the process of the present invention, a variety of hydrocarbon charge stocks can be employed to produce either town gas or high hydrogen content gas. When it is desired to produce hydrogen, a normally gaseous hydrocarbon such as methane, ethane, or natural gas can be employed. In addition, olefinic gases such as ethylene can be employed; however, the amount of steam will be somewhat increased over that necessary for conversion of a saturated hydrocarbon gas in a coke-free operation. When it is desired to produce town gas, a normally liquid hydrocarbon such as hexane or nonane or a petroleum hydrocarbon such as high boiling or low boiling naphtha can be employed. In addition, light and heavy gas oils as well as residual oils can be employed in the process of this invention.

The particular aluminosilicate catalysts which can be employed will also vary depending upon the hydrocarbon charge stock. It is essential that the hydrocarbon and steam reaction be catalyzed by the catalyst hydrogenation component. Thus, when employing an A type crystalline aluminosilicate wherein the hydrogenation component is substantially within the aluminosilicate structure, only the hydrocarbons being a molecular size less than about 5 angstroms, as for example, methane or ethane, are able to enter the catalyst pores and be catalyzed by the hydrogenation component. Similarly, when employing an X-type crystalline aluminosilicate having a pore size of about 13 angstroms wherein the hydrogenation component is within the pores, it becomes difficult to effect complete conversion of residual oils.

As discussed herein, the minimum steam to carbon ratio necessary to maintain substantially coke free operation will vary with the hydrocarbon charge stock employed. In addition, the temperature employed will vary with the hydrocarbon charge stock employed and with the type of product desired. For example, when employing propane or butane as a charge stock and a methane rich gas product is desired, the temperature employed is about 650° F. However, when employing naphtha as a feed stock and a methane rich gas product is desired, the temperature employed will be about 950° F. When a hydrogen rich gas product is desired, and naphtha is employed as the feed stock, a temperature of about 1500° F. will be employed. Broadly, the conditions which can be employed in the process of this invention include a temperature in the range of about 650° F. to about 1500° F. a steam to carbon mole ratio of from about 1.5:1 to about 12:1 preferably from about 1.5:1 to about 6:1 and a pressure from about atmospheric to about 500 p.s.i. preferably from about 100 p.s.i. to about 300 p.s.i. Of course, it is to be understood that it is desirable to minimize the amount of steam employed, and that coke-free operation can be obtained at higher steam to carbon mole ratios. The above ranges represent the practicable conditions under which the process of this invention can be conducted to obtain substantially coke free operation.

In operation, the hydrocarbon feed is preheated to the desired temperature and then contacted with the catalyst in the reactor. The steam can be introduced into the reactor as a separate stream or in admixture with the preheated hydrocarbon feed. The reactor can be operated as a fixed catalyst bed or as a fluidized catalyst bed. The gaseous products are recovered and unconverted hydrocarbon can be recycled to the reactor inlet. When it is desirable to produce a high hydrogen content gas from gaseous hydrocarbons, the gas product therefrom which contains CO and $CO_2$ can be directed to a shift converter wherein CO is reacted with water to form $CO_2$ and $H_2$, using iron oxide, for example, as a catalyst. With CO content down to less than about 0.5 percent, the effluent is directed to a separation step wherein carbon dioxide is removed from the hydrogen gas. This separation can be carried out, for example, by the carbonate-arsenite process. In addition, a conventional methanation step can be used to transform residual CO and $CO_2$ into methane which acts as an inert when the pure hydrogen is to be used in ammonia synthesis.

The following examples are intended to assist in a detailed understanding of the present invention and are not intended to limit the same.

EXAMPLE I

The results set forth below were obtained by conducting a number of separate steam reforming runs in a quartz reactor tube of 1 inch I.D. fitted with an internal thermowell of ¼ inch I.D. The reactor was positioned in the center of a resistance furnace having three separately controlled heating zones.

In operation, 50 cc. of 14 to 25 mesh catalyst was mixed with 50 cc. of 7 to 10 mesh Vycor chips to make up a nine inch long catalyst bed. The catalyst bed was positioned below nine inches of 4 to 7 mesh Vycor chips used as a preheat zone. The preheat section of the furnace was set at 900° F. The entire catalyst bed section was set at one temperature, varying between 1300° F. and 1500° F. for specific runs. Before the start of a run, the catalyst was hydrogen pretreated for one hour at the temperature of the run to reduce metal oxides therein. For the next fifteen minutes, water was metered through a calibrated pump and mixed with the hydrogen before entering the preheat zone. The hydrogen flow was then shut off and liquid hexane and water were separately introduced to the preheat section of the reactor through calibrated pumps at predetermined rates. During operation, the catalyst tempreature was continuously measured at the top, middle and bottom of the catalyst bed.

Product gases were cooled to condense and separate unreacted water and hexane. Non-condensable gases were metered through a wet-test gas meter, collected in a drag stream over ethylene glycol, and analyzed by mass spectrometry. A carbon balance was used as a basis for computing percentage conversion and percentage product gas. Percent conversion is defined as 100 minus weight percent carbon in unreacted charge. Product gas is defined as hydrogen, $C_1$-$C_5$ hydrocarbons, carbon monoxide and carbon dioxide. The weight percent product gas is the grams of carbon in the product gas divided by the grams of carbon in the hexane charge.

Catalyst A, identified in Table I was prepared by first base exchanging a sodium X crystalline aluminosilicate semi-continuously with a rare earth chloride solution at 140° F. by charging 0.75 pound $RECl_3 \cdot 6H_2O$ per pound aluminosilicate to reduce the residual sodium to 0.54 weight percent on dry basis. This material was further base exchanged with a combined solution of 2 percent $RECl_3 \cdot 6H_2O$ and 1 percent $NH_4Cl$ over a 21 day period at 180–190° F. The catalyst was recovered from the solution by filtration, water washed essentially free of chloride ion and then was dried for about 20 hours at about 230° F., pelleted and sized to 8 x 16 mesh, and calcined in air for 10 hours at 1000° F. The calcined exchanged catalyst was then spray impregnated under a vacuum of 2–5 mm. Hg with an aqueous solution of nickel amine chloride to introduce 5 weight percent Ni on the final dry basis. The resultant nickel containing catalyst was dried at about 230° F. for about 20 hours and then calcined at about 1000° F. for about 10 hours. The resultant catalyst had a surface area of 414 square meters per gram, a nickel content of 4.79 weight percent, a cyclohexane absorption of 12.18 weight percent and was 55 percent crystalline by X-ray measurement.

Catalyst B, identified in Table I was prepared by base exchanging sodium Y crystalline aluminosilicate with an aqueous solution containing 14.9 weight percent $$NiCl_2 \cdot 6H_2O$$

and 26.9 weight percent $NH_4OH$ for 13 contacts for about 24 hours and 2 contacts for 72 hours at room temperature. The catalyst was recovered from the solution by filtration, washed with water essentially free of chloride ion and then dried for about 20 hours at about 230° F. The dried catalyst was pelleted and sized 4 to 10 mesh and then was calcined at about 1000° F. for about 10 hours. The resultant catalyst contained 19.8 weight percent nickel, 1.9 weight percent sodium, had a 35 percent crystallinity measured by X-ray and had a cyclohexane absorption of 14.5 percent.

Catalyst C identified in Table I was prepared by impregnating 117.5 g. sodium Y crystalline aluminosilicate that was pelleted and sized to 14 to 25 mesh and calcined 10 hours at 1000° F., with an aqueous solution of nickel nitrate in ammonium hydroxide under a vacuum of 2–5 mm. Hg to deposit 10 percent Ni on a final catalyst basis. The resultant catalyst was dried at about 230° F., for about 20 hours. The dried catalyst was then reduced with hydrogen for 2 hours at 450° F. and 950° F. The resultant catalyst had a surface area of 375 square meters per gram, a nickel content of 11.9 weight percent, a sodium content of 7.3 weight percent and a crystallinity of 35 percent as measured by X-ray.

The results and conditions employed for each catalyst are shown in Table I.

TABLE I

| Catalyst | A | A | A | B | B | B | B | B | B | C | C | C |
|---|---|---|---|---|---|---|---|---|---|---|---|---|
| Hexane, LHSV | 0.32 | 0.32 | 0.32 | 0.17 | 0.17 | 0.17 | 0.32 | 0.32 | 0.32 | 0.32 | 0.32 | 0.32 |
| Steam/carbon, mol ratio | 12.0 | 12.0 | 12.0 | 11.6 | 11.6 | 11.6 | 12.0 | 12.0 | 12.0 | 12.0 | 12.0 | 12.0 |
| Avg. cat. temp., °F | 1419 | 1419 | 1419 | 1463 | 1455 | 1425 | 1425 | 1425 | 1425 | 1442 | 1442 | 1442 |
| Time on-stream, min | 50–70 | 120–140 | 190–210 | 10–30 | 50–70 | 90–110 | 50–70 | 120–140 | 190–210 | 50–70 | 120–140 | 190–210 |
| Carbon balance (g.): | | | | | | | | | | | | |
| Chrg. (as hexane) | 2.90 | 2.90 | 1.48 | 1.42 | 1.42 | 2.90 | 2.90 | 2.90 | 2.90 | 2.95 | 2.95 | 2.90 |
| Recov. (as hexane) | 0.06 | 0.0 | 0.11 | 0.02 | 0.0 | 0.0 | 0.0 | 0.04 | 0.0 | 0.0 | 0.04 | 0.0 |
| Recov. (gaseous prod.) | 2.41 | 2.74 | 2.76 | 1.27 | 1.33 | 1.28 | 2.21 | 2.54 | 2.53 | 2.42 | 2.41 | 2.62 |
| Loss | −0.43 | −0.16 | −0.03 | −0.19 | −0.09 | −0.14 | −0.69 | −0.32 | −0.37 | −0.53 | −0.50 | −0.28 |
| Coke | 0.17 | 0.17 | 0.17 | 0.01 | 0.01 | 0.01 | 0.09 | 0.09 | 0.09 | 0.09 | 0.09 | 0.09 |
| Wt. percent carbon (as hexane) converted | 97.9 | 100 | 96.2 | 98.6 | 100 | 100 | 100 | 98.6 | 100 | 100 | 98.6 | 100 |
| Wt. percent carbon converted to gaseous product | 83.1 | 94.5 | 95.2 | 85.8 | 93.7 | 90.1 | 76.2 | 87.6 | 87.2 | 82.0 | 81.7 | 90.3 |
| Gaseous prod. comp., mol. percent: | | | | | | | | | | | | |
| $H_2$ | 71.6 | 70.9 | 70.6 | 75.5 | 75.6 | 75.5 | 75.9 | 76.0 | 75.9 | 75.4 | 76.0 | 75.0 |
| $CH_4$ | 1.1 | 0.7 | 0.7 | 0.0 | 0.1 | 0.0 | 0.1 | 0.2 | 0.2 | 0.0 | 0.2 | 0.2 |
| $C_2$–$C_5$'s | 0.6 | 0.6 | 1.0 | 0.0 | 0.0 | 0.0 | 0.3 | 0.0 | 0.1 | 0.1 | 0.1 | 0.3 |
| $CO$ | 21.2 | 21.8 | 22.2 | 6.1 | 5.5 | 5.5 | 6.4 | 5.6 | 5.6 | 6.6 | 6.6 | 7.3 |
| $CO_2$ | 5.2 | 5.9 | 5.8 | 18.3 | 18.7 | 18.7 | 17.1 | 18.1 | 18.0 | 17.1 | 17.1 | 17.4 |
| $CO/CO_2$ ratio | 4.1 | 3.7 | 3.8 | 0.3 | 0.3 | 0.3 | 0.4 | 0.3 | 0.3 | 0.4 | 0.4 | 0.4 |

We claim:

1. A method for producing gaseous products including town gas and gaseous products rich in hydrogen which comprises passing a normally gaseous or liquid hydrocarbon charge in contact with a crystalline aluminosilicate cracking catalyst having one or more metal hydrogenation-dehydrogenation components associated therewith, said hydrocarbon-catalyst contact being effected at elevated steam reforming temperatures with an amount of steam selected to minimize the deposition of residual coke on the catalyst and improving the steam reforming of the hydrocarbon charge by employing a crystalline aluminosilicate having a particle size less than about 1 micron.

2. The method of claim 1 wherein the crystalline aluminosilicate has a particle size of less than 0.5 micron.

3. The method of claim 1 wherein the metal hydrogenation-dehydrogenation component employed with the crystalline aluminosilicate is selected from Group VI–B and Group VIII of the Periodic Table which may be in oxide form or mixtures thereof.

4. The method of claim 1 wherein the crystalline aluminosilicate is a rare earth exchanged zeolite Y.

5. The method of claim 1 wherein the crystalline aluminosilicate is a rare earth exchanged zeolite X.

6. The method of claim 1 wherein the hydrogenation component is nickel.

7. The method of claim 1 wherein the hydrogenation component is a noble metal.

8. The method of claim 4 wherein the hydrogenation component is a Group VIII metal component.

References Cited

UNITED STATES PATENTS

| 3,144,414 | 8/1964 | Silverman | 252—459 XR |
| 3,329,628 | 7/1967 | Gladrow et al. | 252—459 XR |
| 3,351,566 | 11/1967 | Taylor et al. | 48—214 XR |
| 3,388,074 | 6/1968 | Reitmeier | 48—214 XR |

FOREIGN PATENTS 930,512  7/1963  Great Britain.

MORRIS O. WOLK, Primary Examiner

R. E. SERWIN, Assistant Examiner

U.S. Cl. X.R.

252—459